June 27, 1944.　　　R. MAUTSCH　　　2,352,443
PROCESS AND INSTALLATION FOR THE MANUFACTURE OF SHAPED METAL PRODUCTS
Filed June 12, 1939　　　7 Sheets-Sheet 3
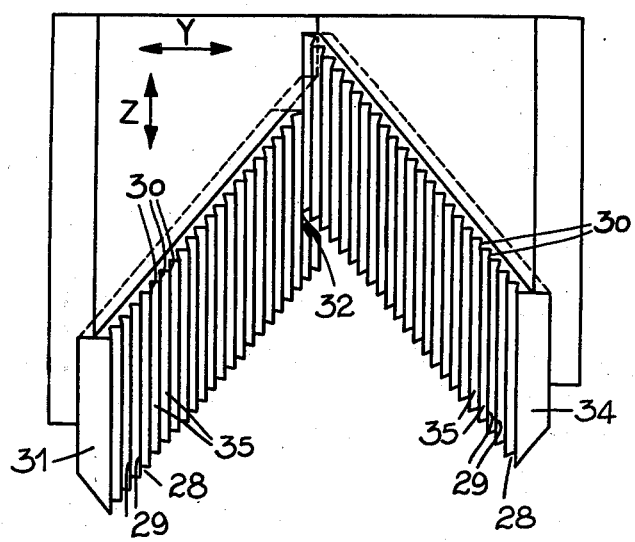
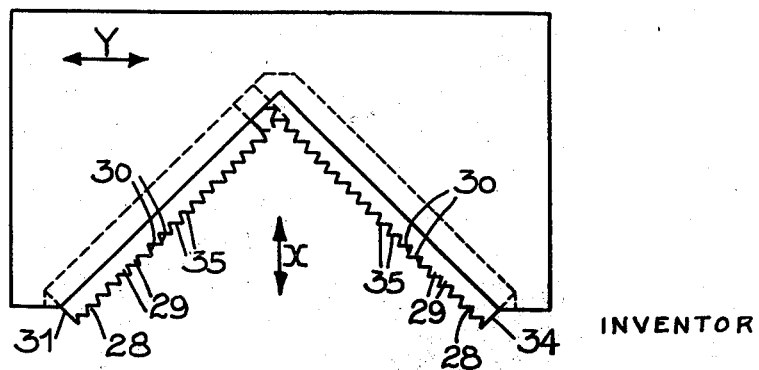
INVENTOR
ROBERT MAUTSCH
By Young, Emery & Thompson
ATTYS.

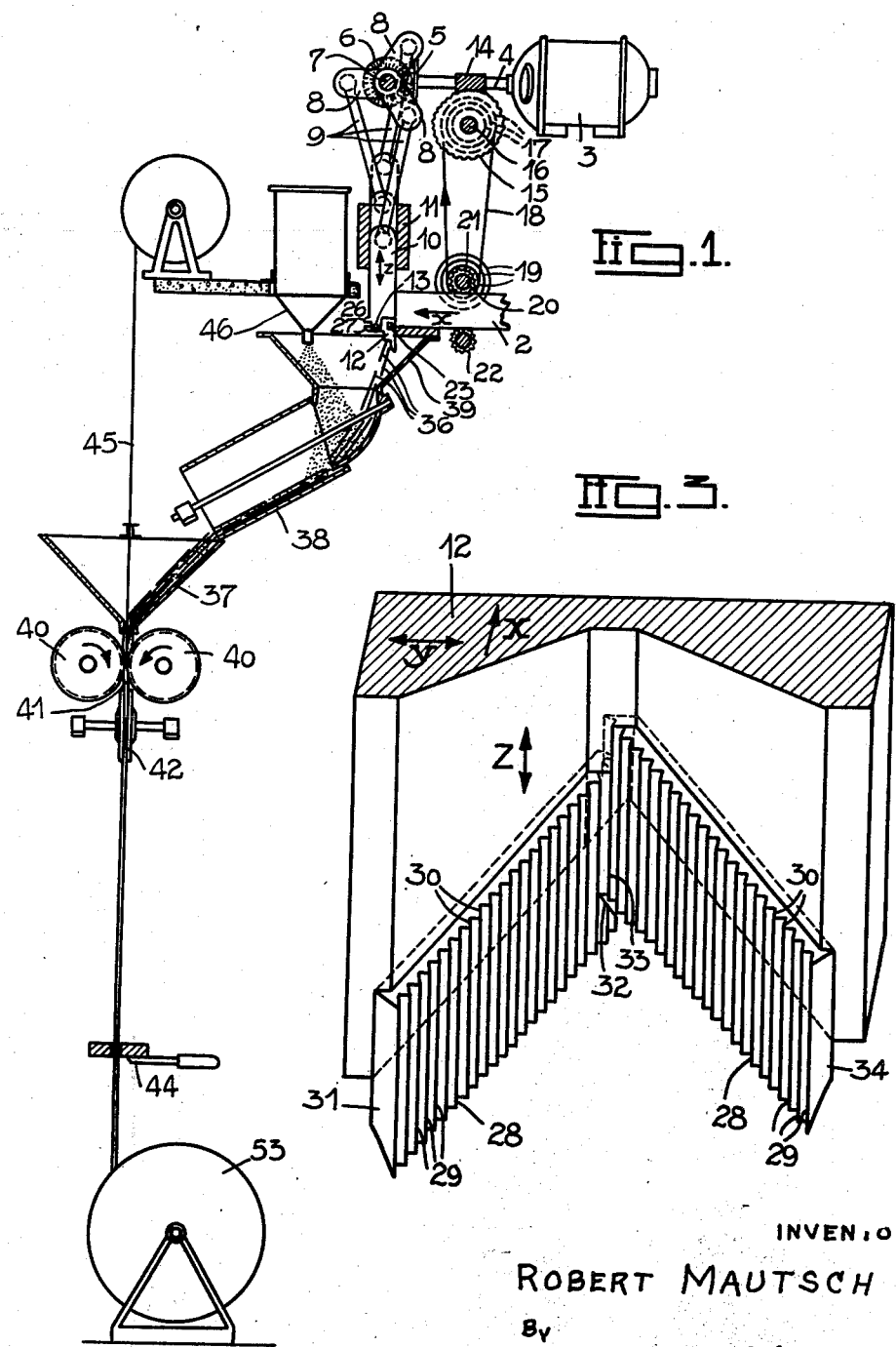

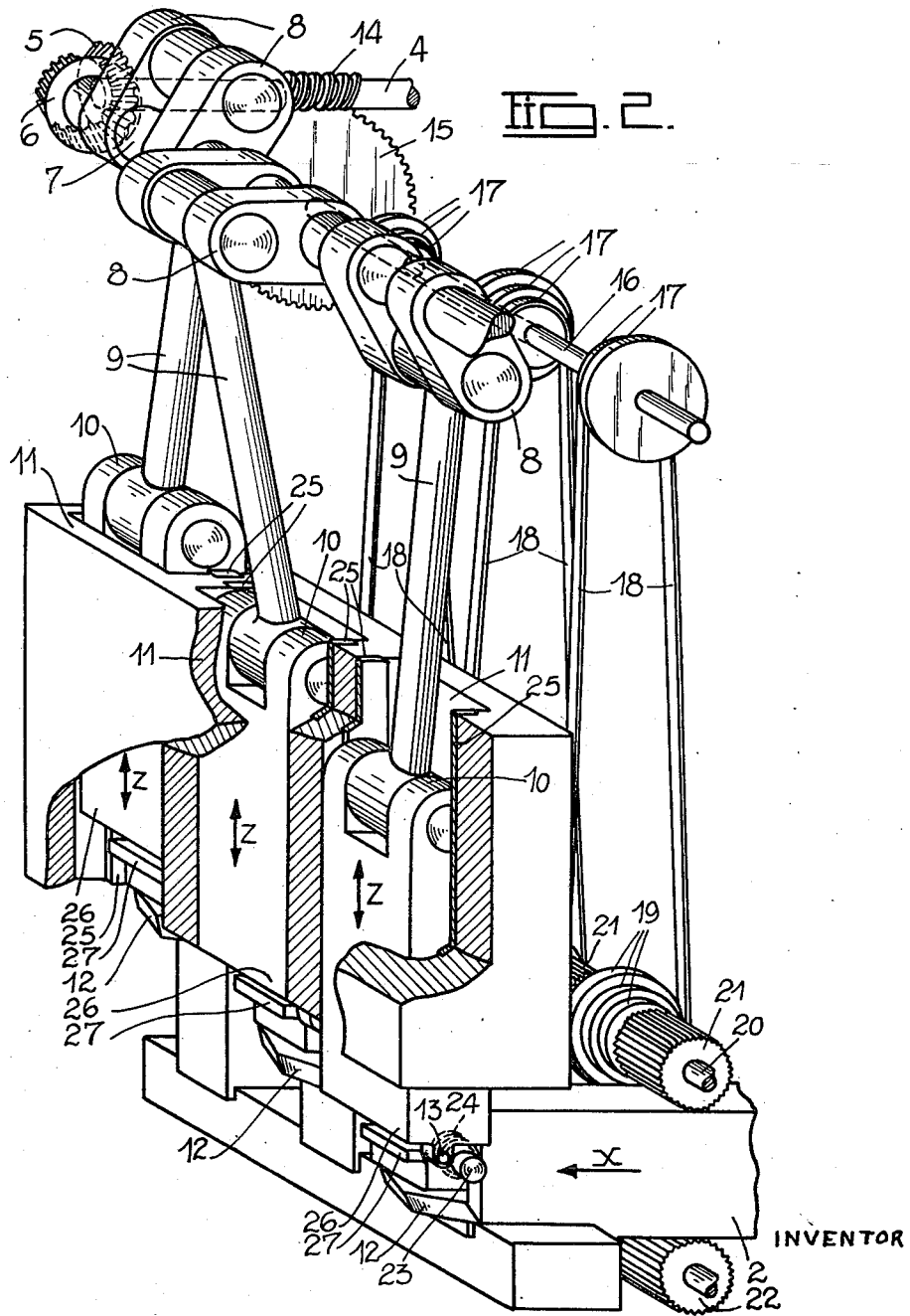

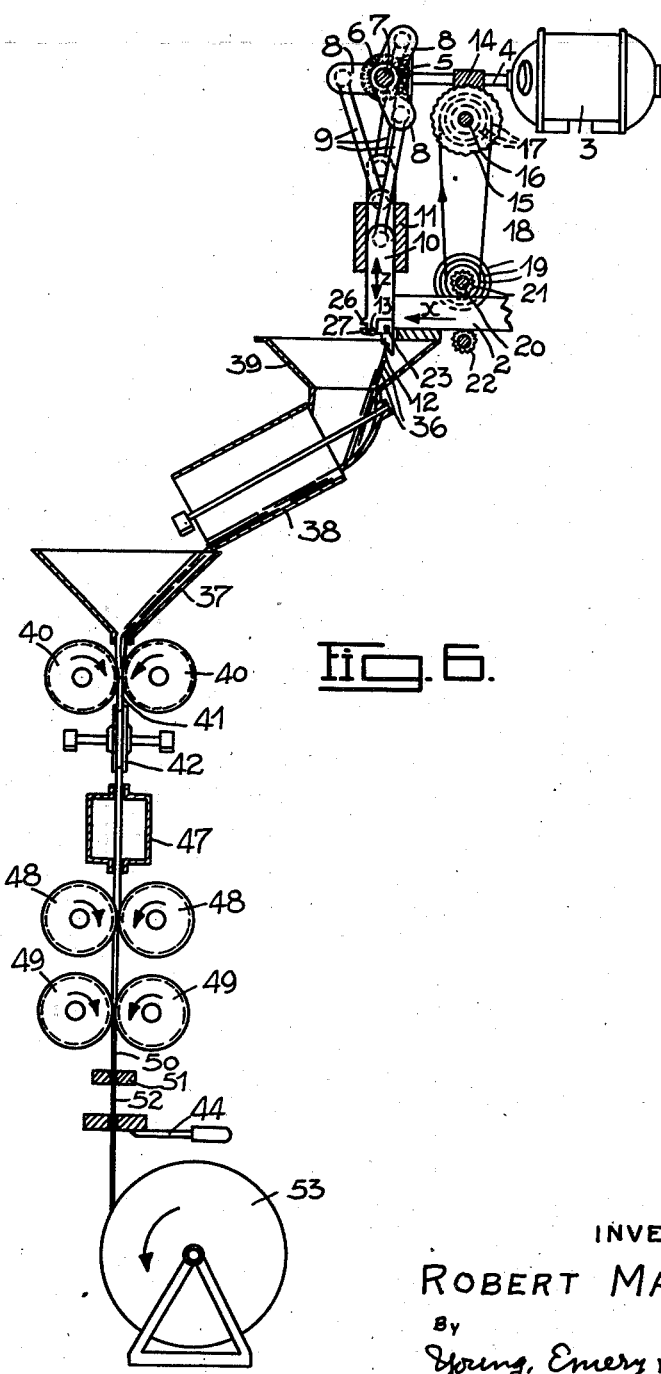

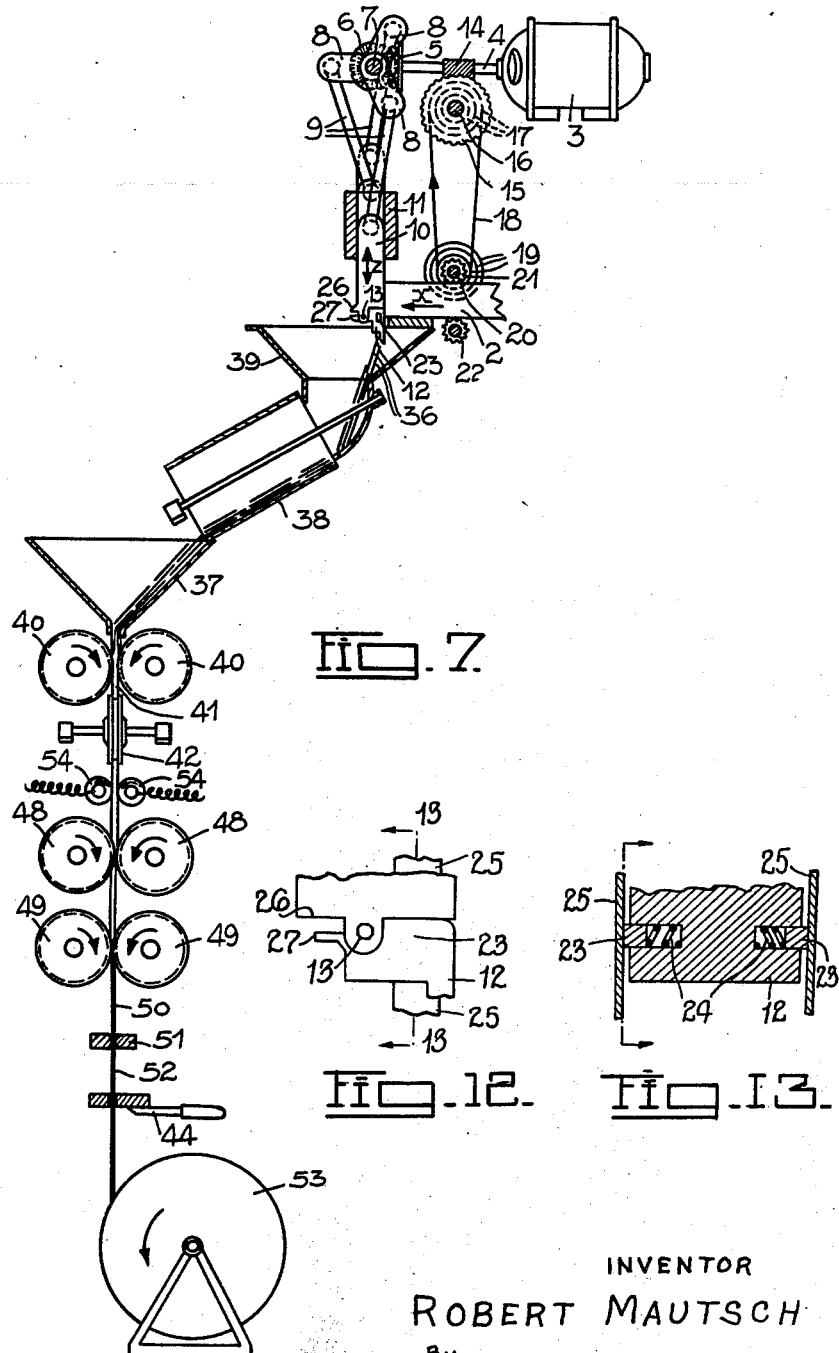

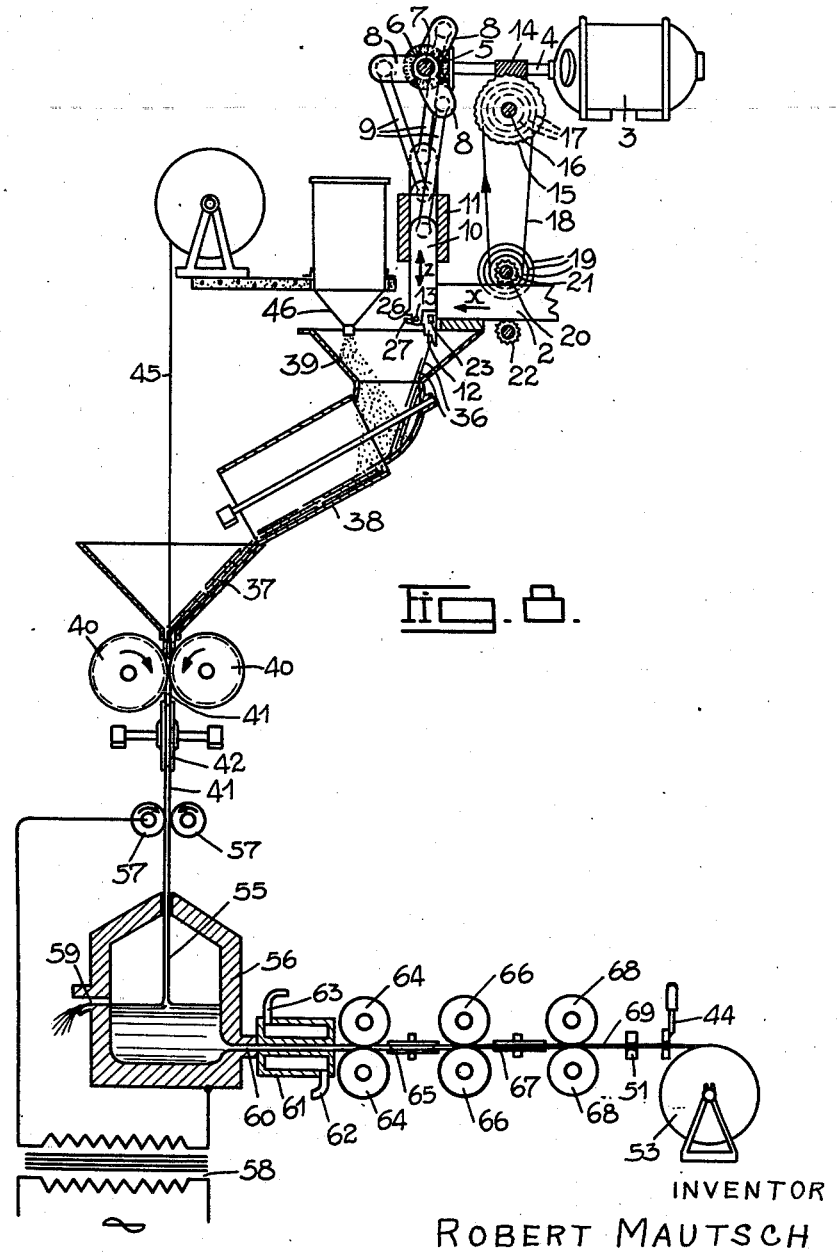

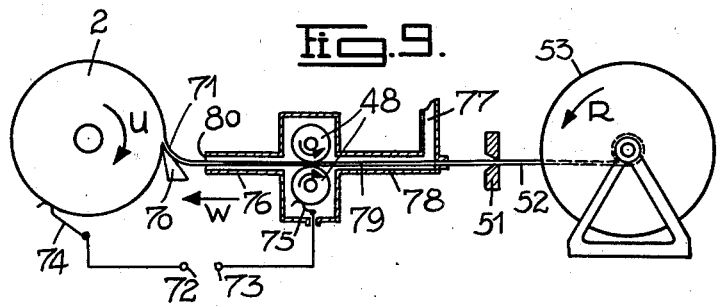
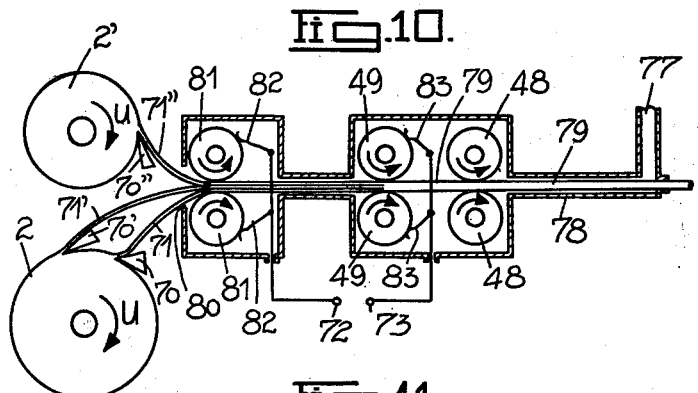
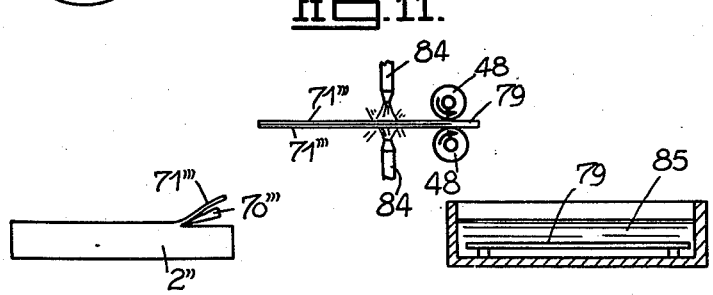

Patented June 27, 1944

2,352,443

UNITED STATES PATENT OFFICE 2,352,443

PROCESS AND INSTALLATION FOR THE MANUFACTURE OF SHAPED METAL PRODUCTS

Robert Mautsch, Brussels, Belgium; vested in the Alien Property Custodian

Application June 12, 1939, Serial No. 278,768
In Great Britain June 30, 1938

21 Claims. (Cl. 29—34)

The present invention relates to a process for the manufacture of shaped metal products, particularly of shaped metal products of small cross-section, from large metal pieces, in which process use is made of rolling mills to transform the large pieces into shaped sections.

By the expression "shaped products of small cross-section" must be understood, in the present application, not only metal products of more or less complicated sections commonly called "sections" in rolling mill practice, but also products of round, square or rectangular section, as also wires. It should be noted in this respect that one of the principal objects of the invention is in particular to produce wires, that is to say, of shaped sections of great length and of small cross-section, which in the present state of the art cannot be directly obtained by rolling from large pieces.

Hitherto, in order to obtain shaped products of small cross-section and in particular rods for wire drawing the metal is usually cast into ingots which are passed through a rolling mill, generally termed blooming, to transform them into blooms. These are heated again before being passed through a fresh rolling mill in order to obtain billets which must also be heated before passing them through another rolling mill where they are transformed into rods for wire drawing.

Sometimes instead of commencing with cast ingots, large masses are used resulting from the cold compression of metal scrap such as turnings from lathes. These masses are then heated to the welding point of the scraps and then rolled and heated again successively until obtaining the desired section.

The present invention has for its principal object to reduce the cost of the profile products particularly of those of small cross-section by avoiding these successive heatings and rollings.

To this end, according to the process of the invention, the large pieces above mentioned are cut into long and fine elements which are passed before they become oxidised, between rollers similar to rolling mill cylinders producing at their exit a continuous faggot.

This process has the advantage of permitting the sections desired to be obtained in a short time and much more cheaply than by the process of the reduction in section of the large starting pieces by heating and successive rollings alone. Furthermore, the cost of an apparatus for carrying out this process only represents a small part of the cost of the present apparatus.

This process also permits of using as the initial material all kinds of large pieces, even those generally considered as scrap. For example, the scrap of ingots and of large bars can be used. There may also be used large scrap such as the plates of old ships, axles, transmission shafts, and the like, suitably cleaned.

The process according to the invention permits of obtaining in a continuous and regular manner a metallic product of quite definite composition, which is not the case when blooms are rolled which result from the compression of dirty and oxidised scrap to which must be added substances intended to correct the defects caused by the impurities which soil the scrap used.

With a view to permit the regular and uniform supply of the compressing rollers, it is proposed, in the case of rolling of long and fine elements whose length is nevertheless relatively short in comparison with the length of the said continuous faggot, to deliver directly into a hopper serving for the feed of the first cylinders, fine and long elements cut from large initial pieces.

According to an additional and very advantageous feature, the long and fine elements are arranged in parallel to each other before being passed between the cylinders which agglomerate them into bundles.

The bundle obtained by the process described above, may be used as added metal for welding.

It may also be used as the electrode in an electric furnace where it is desired to obtain a metal or alloy of a perfectly definite composition.

There may also be obtained a section iron having a great mechanical strength by heating the bundle to a temperature sufficient to permit the welding of the elements by compression and by compressing the bundle thus heated in such manner as to ensure this welding by its passage between rollers similar to rolling mill cylinders. In particular for the manufacture of wires, the shaped section obtained by compression whilst hot of the bundle of small cross-section is drawn in such manner as to form a wire.

The invention has also for its object an apparatus particularly adapted for carrying out the process to which reference has been made just above.

According to the invention this apparatus comprises at least one machine arranged in such manner that the long and fine metallic elements which it cuts can pass by gravity into a hopper serving for the supply with long and fine metallic elements to rollers which are similar to rolling mill cylinders and which compress these elements into a bundle.

In order to permit of the easy regulation of the composition of the shaped product of small section, there is provided for each machine for cutting the large pieces into long and fine elements, means for regulating the quantity of these cut up elements.

According to a simple, cheap and strong embodiment, the cutting up machines comprise tools having an alternating movement.

The invention has also for its object a particular manner of realising the process according to the invention, this particular manner being intended to facilitate the manufacture of shaped products in comparison with the case of rolling of cut elements of relatively short length compared with the length of the shaped product obtained. This particular manner enables moreover to ameliorate when desirable the electric conductibility in comparison with the case where use is made of cut elements or relatively short length.

According to this particular manner, elements obtained by cutting are rolled, the length of the elements being such that they extend over the entire length of the finished shaped product.

According to an advantageous embodiment of the invention, a single cut element having a cross-section approximately equal in area to that of the desired profile is rolled.

In this way, there is obtained, even by cold rolling, particularly in the case of a ribbon-like element formed of soft steel, a shaped product of noteworthy mechanical properties.

It may be employed in particular either alone or in juxtaposition to other similar shaped products, for the production of the tubular covering of welding bars formed in manner known per se as a tubular covering produced by winding one or more ribbons and containing other materials, generally in pulverulent form.

In cases where a single cut element having a cross-section approximately equal in area to that of the desired shaped product is rolled, this element is preferably so cut that it has a cross-section of a form approximating to that of the desired shaped product.

In this way, bars of solid section for welding may be directly manufactured by cutting followed by cold rolling.

In cases where hot rolling is carried out, it is preferable to effect the hot rolling immediately after the cutting so as to utilise the heat evolved by the cutting of the elements.

In cases where the cut element is electrically heated by the Joule effect, the heating is carried out up to the point of the rolling, so that the maximum temperature is only reached at the point where the rolling commences.

Further features and details of the invention will appear from the description of the drawings attached to the present specification, which show diagrammatically some constructional forms of apparatus suitable for carrying out the process according to the invention.

Figure 1 is an elevation of an installation according to the invention with vertical section of the upper part of this apparatus.

Figure 2 is a view in perspective on a larger scale and with parts broken away, of a portion of the apparatus according to Figure 1.

Figure 3 is a cross-sectional view in perspective of a tool with which are equipped the cutting machines shown in Figures 1 and 2.

Figures 4 and 5 are respectively a view in elevation and a view in plan of the tool according to Figure 3.

Figures 6, 7 and 8 show as in Figure 1, three other embodiments of an apparatus according to the invention.

Figure 9 shows apparatus for the manufacture of a continuous wire from a single metal piece.

Figure 10 shows apparatus for the manufacture of continuous metal bands from two metal pieces.

Figure 11 shows apparatus for manufacturing metal bands of limited length from a single metal piece.

Figures 12 and 13 are detail views in side elevation and sectional elevation, respectively, of a tool mounting, the section in Figure 13 being taken at 13—13 in Figure 11.

In these different figures, the same reference characters have been employed for identical elements.

Figure 1 shows an apparatus particularly adapted for carrying out the invention. In this apparatus large pieces such as 2 constituted for example by blooms or large scrap pieces are cut up by means of machines comprising tools with alternating movement.

The cutting machine shown is operated by a motor 3 the shaft 4 (Figures 1 and 2) of which carries a bevel pinion 5 engaging with another bevel pinion 6 keyed on to a crank shaft 7. This crank shaft has three cranks 8 to each of which is coupled a connecting rod 9 attached to a tool carrier 10. Each of the latter is guided rectilinearly in a guide 11 and carries a tool 12 pivoted at 13.

The shaft 4 also carries an endless screw 14 engaging with a helicoidal wheel 15 keyed on to a shaft 16. There are keyed on to the latter three stepped pulleys 17 over each of which passes a belt 18 running on the other hand over a stepped pulley 19. The different pulleys 19 are mounted freely on a shaft 20 and are integral with grooved wheels 21. Each piece 2 to be cut up is held between a grooved wheel 21 and another similar wheel 22. Its feed is therefore continuously controlled by the motor 3.

To prevent the tools 12 rubbing against the pieces 2 on their return stroke, they are made to rock on their pivots 13 by the dragging action of shoes 23 urged by springs 24 to bear against bands 25 arranged laterally. The pivoting of the tool 12 in the direction corresponding to their movement away from the pieces 2 to be cut up is limited by a stop 26 on the tool carrier and against which bears a projection 27 on the tool. This control of the pivoting movement of the tool 12 is much simpler than the positive control which has been proposed in machines such as shaping machines to cause the pivoting of the tools under similar circumstances.

In principle, to cut long and fine elements by means of a reciprocating tool, it is proposed to use a tool provided with two cutting edges 28 (Figures 3, 4 and 5) each comprising fine teeth such as 29 disposed adjacently in such a manner that the projections of the said teeth partly overlap each other parallel to the transverse direction with respect to the direction of feed of the piece to be cut. In other words, if the arrow X of Figures 1, 2, 3 and 5 represents the direction in which the piece to be cut moves horizontally, the transverse direction to the direction of feed of the piece to be cut is represented by the double arrow Y of Figures 3, 4 and 5. It will be seen that the faces 35 (Figures 4 and 5) of the teeth 29 which are parallel to the direction of the arrow Y are partly concealed by one another when viewed in the direction of feed X of the piece to be cut, due to the fact that the faces 30 of these teeth form acute angles with the faces 35.

The general direction of each of the cutting edges of the reciprocating tool shown in Figures 3, 4 and 5 is oblique relatively to the plane in which the piece to be cut moves. This follows particularly from Figure 4.

In fact, this figure is a view in elevation of the tool and the lower toothed edge of the latter is oblique relatively to the horizontal plane in which the piece to be cut moves.

If the tool had a single cutting edge it would give rise to a lateral thrust of the piece 2 to be cut, in one or other of the directions indicated by the double arrow Y. With a view to preventing this thrust, the two cutting edges are symmetrically inclined relatively to the direction of feed X of the piece to be cut.

In other words, the two cutting edges 28 of the tool form together a V, the plane of symmetry of which is parallel to the direction of feed X of the piece to be cut. In Figure 5 which is a view in plan, it will be seen clearly that the two cutting edges 28 form a V the plane of symmetry of which is parallel to the horizontal direction of feed X of the piece to be cut.

In practice, a tool is used the operative parts of which are detachable. In order to avoid the necessity of a precise positioning of each operative part without having to fear the formation of an uncut strip at the bottom of the V if the operative parts are not sufficiently close together, one of the operative parts is arranged so that its cutting edge is at a different level from that of the cutting edge of the other operative part, and the operative part, the cutting edge of which is at a higher level than that of the cutting edge of the other operative part is caused to penetrate into the other operative part so that the projections of the cutting edges intersect in the direction of movement of the tool.

In Figures 3 and 4 it will be seen that the operative part 31 of the tool is cut at 32 at a certain distance from its cutting edge and that a part 33 of the other operative part 34 of the tool penetrates the operative part 31, so that the projections of the cutting edges are superposed, as shown in Figure 5 in the direction of movement of the tool, indicated by the double arrow Z.

The long and fine elements 36 which are cut from the pieces 2 come into a hopper 37 (Figure 1) after having been in an inclined rotary drum 38 towards which they are guided by a hopper 39. In the inclined rotary drum 38, the long and fine elements 36 become arranged parallel to themselves before passing into the hopper 37. The elements 36 are carried out of the hopper 37 by a pair of rollers 40 similar to rolling mill cylinders. These cylinders have for effect to compress laterally the mass of long and fine elements coming out of the hopper 37 in such manner as to form a continuous bundle. These cylinders are at such a separation as to give rise at their outlet to a bundle 41 of small cross-section. The compression of this bundle may be increased by passing it into a fresh pair of cylinders 42, the axes of which are for example directed perpendicularly to the axes of the cylinders 40. If necessary the bundle coming from the second pair of cylinders can pass into one or more other pairs. There is thus obtained a continuous bundle which may be utilised for example as welding rod either for arc welding or for blowpipe welding or soldering. This bundle may be wound on a drum 53 or it may be cut into sections by means of a cutting machine shown diagrammatically at 44.

As previously stated, after these long and fine elements are cut they are passed directly between rolling mill cylinders before becoming oxidized. The apparatus shown in Figures 1, 6, 7 and 8, schematically show installations for carrying out the successive steps of the present process; however, it is evident that the drawings are not made to scale. Actually, the cut fibres arrive almost instantaneously after cutting, between the rolls 40. The distance that the fibres fall by gravity is short, and a sufficient number of fibres are cut simultaneously to form a wire or elongated profile bar continuously at the rolls without waiting for an accumulation of fibres. In the case of most metals, injurious oxidation will not occur when the distance between the cutting mechanism and the rolls 40 is short, but where a highly oxidizable metal is being processed a nitrogen atmosphere for preventing oxidation can be maintained between the cutting mechanism and the rolls 40, in a similar manner to the structures shown in Figures 9 and 10.

Where it is desired to distribute in a particularly precise manner over the length of the continuous bundle a body of a well defined composition the proportion of which in the bundle is to be small, there can be arranged in the interior of this bundle a continuous wire of such body 45 carried along at the same time as the elements 36, by the rolling mill cylinders.

Where it is desired to incorporate in the bundle substances in powder form intended to modify the composition of the final product, it is advantageous to add these substances to the elements 36 before the latter pass into the inclined rotary drum 38. This is shown on Figure 1 where substances in powder form are seen falling from a reservoir 46 into the hopper 39 receiving at the same time the elements 36 cut from the pieces 2.

It will be noted that the passage of the elements 36 from the point where they are cut up, to the hopper which feeds the rolling mill cylinders, and which takes place simply by gravity, presents an important advantage as compared with heaping the elements at the foot of the cutting machine and having to pick these up to be loaded into the hopper 37. In fact, in the latter case, the compactness of the elements 36 loaded into the hopper 37 might easily vary which would unfavourably influence the regularity of the product coming from the rolling mill cylinders.

The bundle coming from the rolling mill cylinders does not have a mechanical strength which is comparable to that of a section iron obtained by casting and the rolling of a metallic mass, but a similar strength can easily be given to it by heating it at the outlet of the rolling mill rollers, up to a temperature permitting the welding together between themselves of the metallic elements by compression.

In Figure 6 there is shown an installation in which the bundle 41 coming from the rolling mill rollers passes first into a furnace 47 where it is heated to the temperature of welding of the metallic elements which constitute it, and then between the rolling mill cylinders 48 and 49 which effect the compression necessary for this welding. The product 50 coming from the rolls 49 may be cold drawn in a wire-drawing machine 51 in order to give a wire 52 having all the qualities of a wire obtained by the ordinary processes of manufacture. This wire may be wound on a drum 53 or be cut up by a cutting machine 44.

In Figure 7 there is shown an installation similar to that of Figure 6 in which the heating of the bundle 41 coming from the cylinders 42, instead of taking place in a furnace is effected by the passage of an electric current delivered by small wheels 54 arranged on each side thereof.

If necessary the rolling mill cylinders such as 48 and 49 could serve to deliver the heating current thus replacing the small wheels 54.

If it is desired to obtain a section product constituted by an alloy of definite composition, pieces 2 of different composition and in accordance with the alloy to be formed are cut up by the cutting machines. The speeds of feed of these pieces are regulated, for example by the choice of the pulleys 17 and 19 over which pass the belts 18, corresponding to the proportion of the different metals which constitute the alloy to be formed. In the same way metallic powders necessary for the formation of the alloy are caused to drop from the reservoir 46. The bundle 41 of small cross-section coming from the rolling mill cylinders 42 is then used as the electrode in an electric furnace. This is what is shown by Figure 8 where it will be seen that the current is supplied to the electrode 55 of an electric furnace 56 by small wheels 57 connected to the secondary of a transformer 58, the other end of the winding being connected to the base of the furnace.

The slag is evacuated in a continuous manner from this furnace by means of an orifice 59 whilst the molten metal is continuously discharged through an orifice 60 in proportion to the fusion of the electrode.

Immediately after its exit from the furnace, this metal is cooled to a pasty state, passing through a nozzle 61 through the jacket of which passes water introduced at 62 and discharged at 63. The pasty rod coming from this nozzle is rolled to the desired profile by rolls such as 64, 65, 66, 67 and 68. There is thus obtained a wire 69 which may be drawn through a wire-drawing die 51 and either wound on a drum 53 or cut into pieces by a shearing or cutting machine 44.

The alloy thus obtained is of great regularity.

Actually, all the operations carried out in the manufacture of this alloy permit of obtaining great precision in the proportioning of the constituents, which is difficult to obtain with present-day industrial processes.

The possibility of instantly varying the proportion of each of the constituents permits not only of varying instantly and as desired, the characteristics of the alloy obtained, but also of changing over in a very short time from the manufacture of one alloy to that of a very different alloy.

Instead of utilising cutting machines provided with a reciprocating movement, naturally other machines may be used.

If, for example, the output of long and fine elements is to be considerable, it may be of advantage to use machines comprising rotary tools. These tools may be arranged in such manner that several of them simultaneously cut into the same large piece.

In Figure 9, there is shown a metal piece formed by a cylinder 2 rotating in the direction of the arrow U in front of a tool 70 which may be displaced in the direction of the arrow W. This tool cuts out from the mass of the metal cylinder 2 a blank 71 having a cross-section substantially equal in area to that of a metal wire which it is desired to manufacture. The form of this cross-section, moreover, approximates to that of the wire to be manufactured.

The blank obtained in this manner is generally unsuitable for industrial use because the metal of which it is formed is cold worked and consequently "short." The blank may have fissures or incipient cracks. Moreover, it is not always of the exact form and dimensions required.

In order to increase the mechanical resistance of the blank, it is hot rolled between a pair of rolls 48. The heating of the blank is carried out electrically by the Joule effect. For this purpose, a source of current of regulable intensity is connected to two terminals 72 and 73 connected respectively to brushes 74 and 75. The brush 74 bears against the metal cylinder 75, while the brush 75 bears against one of the rolls 48.

The blank 71 acts as a resistant element over its entire length between the metal cylinder 2 and the rolls 48. Consequently, the temperature of this blank increases in proportion as the blank approaches the rolls 48. Owing to the fact that the blank is heated until the moment it is rolled, it does not cool between the point at which it reaches its maximum temperature and the point at which it is rolled. Consequently, the maximum temperature to which the blank must be brought is that required for the rolling.

The hot rolling has the effect of restoring the metal by a form of forging to the sound condition which had been destroyed by cold working during the cutting. At the same time, the hot rolling has the effect of producing a shaped product having the exact section and form desired.

In order that the heat generated in the blank during the cutting thereof may be utilised, it is advantageous to dispose the rolls in the neighbourhood of the point at which the cutting of the blank is effected.

Between the point of the cutting and the point of the rolling, the blank 71 is passed into a sleeve 76 preferably constructed of heat-insulating material. In this manner, the cooling of the blank during its movement towards the rolls is reduced. This cooling is also counteracted by the circulation of a current of hot neutral gas, such as nitrogen, between the sleeve 76 and the blank 71. The nitrogen is introduced at 77 at the extremity of a sleeve 78 disposed behind the rolls 48.

By regulating the intensity of the current of nitrogen, the rate of cooling of the shaped product 79 leaving the rolls 48 may be varied. The nitrogen heated in this manner passes about the rolls 48 and then into the sleeve 76, leaving at the extremity 80 thereof, which is in the neighbourhood of the cutting point.

The use of a neutral gas such as nitrogen under the aforesaid conditions also has the advantageous effect of preventing oxidation of the metal while it is at a sufficient temperature to oxidise rapidly in the presence of air.

Upon leaving the rolls 48, the shaped product 79 has, for example, the form of a wire of circular cross-section. A wire of this type may be advantageously used as a welding bar and in particular as an electrode for arc welding. If it is desired further to improve the mechanical properties of this wire, it may be drawn after sufficient cooling by passing it through a draw plate 51. The drawn wire 52 leaving this draw plate may be wound on to a drum 53 driven in the direction of the arrow P.

If it is not desired to obtain a shaped product having mechanical properties such as those obtained after hot rolling, the blank 71 may merely be cold rolled. In this way, a shaped product having good mechanical properties is obtained, particularly if the blank is very thin.

Annealing of the shaped product substantially improves the mechanical properties of the shaped product obtained by cold rolling.

Use may also be made of a ribbon of this nature for forming, either alone or in juxtaposition with other similar ribbons, the tubular covering of a welding bar and in particular of an electrode for arc welding formed in manner known per se as a tubular covering obtained by winding one or more strips and containing other materials, generally in pulverulent form.

If it is desired to manufacture a shaped product of relatively great thickness, for example a hoop iron, it may be difficult to cut a blank of sufficient thickness to form by itself the shaped product in question. This difficulty may be due especially to the fact that the cut metal would be too cold-worked and that the tool would be abnormally worn. In this case, several blanks of a total thickness corresponding to that of the desired shaped product may be welded by hot rolling.

Figure 10 shows a metal piece 2, from which two blanks, such as 71 and 71' are simultaneously cut by means of tools designated respectively by 70 and 70', and a metal piece 2' from which a blank 71" is cut by means of a tool 70". These three blanks 71, 71' and 71" are applied one against the other by means of a pair of rolls 81 electrically connected to the current terminal 72 by brushes 82. The other current terminal 73 is connected by brushes 83 to rolls 49. The heating of the three blanks applied one against the other is produced by the Joule effect between the rolls 81 and 49. This heating is such that the temperature of the blanks is sufficient to permit welding thereof owing to their passage between the rolls 49. This temperature may therefore be somewhat higher than in the case of the process illustrated in Figure 9, in which the rolls 48 serve solely to impart the desired form and section to the shaped product 79.

In the case of the installation shown in Figure 10, the shaped product 79 leaving the rolls 49 passes afterwards between finishing rolls 48, which serve the same purpose as the rolls 48 in Figure 9.

The metal cylinder 2' is assumed to be of different composition from the metal cylinder 2. The shaped product 79 obtained by the combination of the blanks 71, 71' and 71" is therefore a heterogeneous shaped product of the type generally known as "bi-metallic."

Figure 11 shows an installation in which a tool 70''' cuts from a piece 2" blanks such as 71''' of definite length. Two of these blanks have been superimposed one upon the other so that their extremities coincide before they pass between the rolls 49. The heating of the blanks before the passage thereof between the rolls 49 is effected by means of gas burners 84, so that these blanks are welded together during the course of their hot rolling. Upon leaving the rolls 49, the shaped products may be tempered by sudden cooling in a bath of oil or water 85.

This method of carrying out the process is admirably suitable for producing hoops. The rolls 49 may be followed by other rolls, such as the rolls 48 shown in the previous figures.

It will be understood that the invention permits of producing not only wires, strips and sheets, but also other shaped products, especially shaped products of small section.

It will also be understood that the heating could be effected under conditions other than those described in the foregoing.

What I claim is:

1. A process for the manufacture of elongated profile bars, wires and the like from massive metal pieces of larger cross-section, consisting in cutting said metal pieces into long and fine elements, in interleaving said cut elements, and in passing the interleaved elements before they become oxidised between rolling mill cylinders arranged so as to produce at their exit the desired product.

2. A process for the manufacture of elongated profile bars, wires and the like from massive metal pieces of larger cross-section, consisting in cutting said metal pieces into long and fine elements whose length is nevertheless relatively short in comparison with the length of the desired product, in interleaving said elements, in passing these interleaved elements before they become oxidised between rolling mill cylinders arranged so as to produce at their exit the desired product, and in guiding directly the cut elements from the place where they are cut towards a hopper serving for the supply of the rolling mill cylinders.

3. A process for the manufacture of elongated profile bars, wires and the like from massive metal pieces of larger cross-section, consisting in cutting said metal pieces into long and fine elements whose length is nevertheless relatively short in comparison with the length of the desired product, in interleaving these cut elements in parallel to each other, in leading the parallelly arranged cut elements towards rolling mill cylinders, and in passing said elements before they become oxidised between said rolling mill cylinders arranged so as to produce at their exit the desired product.

4. A process for the manufacture of elongated profile bars, wires and the like from massive metal pieces of larger cross-section, consisting in cutting said metal pieces into long and fine elements, in interleaving said cut elements, in passing the interleaved elements between rolling mill cylinders, in heating the product obtained at the exit of said cylinders to a temperature sufficient to permit the welding of the elements by compression, and in passing said heated product before the cut elements become oxidised between other rolling mill cylinders arranged so as to produce at their exit the desired product.

5. A process for the manufacture of elongated profile bars, wires and the like from massive metal pieces of larger cross-section, consisting in cutting said metal pieces into long and fine elements, in interleaving said cut elements, in passing the interleaved elements between rolling mill cylinders, in heating the product obtained at the exit of said cylinders to a temperature sufficient to permit the welding of the elements by compression, in passing said heated product before the cut elements become oxidised between other rolling mill cylinders, and in drawing into a wire the product so obtained.

6. A process for the manufacture of elongated profile bars, wires and the like from massive metal pieces of larger cross-section, consisting in cutting said metal pieces into long and fine elements, in interleaving said cut elements, in passing the interleaved elements between rolling mill cylinders, in introducing before the cut elements become oxidised the product obtained at the exit of these cylinders in a continuous manner into an electric furnace, in discharging the fused metal in a continuous manner, in cooling to a pasty rod the metal flowing from the furnace immediately after its exit from the latter, and in rolling this pasty rod into the desired product.

7. A process for the manufacture of elongated profile bars, wires and the like from massive metal pieces of larger cross-section, consisting in cutting massive metal pieces into continuous and fine elements, interleaving said cut elements, and in passing the interleaved elements before they become oxidised between rolling mill cylinders arranged so as to produce at their exit the desired product.

8. An installation for the manufacture of elongated profile bars, wires and the like from massive metal pieces of larger cross-section, comprising at least one machine for cutting these pieces into long and fine elements, rolling mill cylinders disposed so as to produce at their exit an agglomerate of the cut elements, and a hopper serving for the supply of the cut elements to the rolling mill cylinders, said hopper being disposed at a level below that of the cutting machine in such a position relatively to the latter that the cut elements may reach said hopper directly by gravity.

9. An installation for the manufacture of elongated profile bars, wires and the like from massive metal pieces of larger cross-section, comprising at least one machine for cutting these pieces into long and fine elements, rolling mill cylinders disposed so as to produce at their exit an agglomerate of the cut elements, a hopper serving for the supply of the cut elements to the rolling mill cylinders and disposed at a level below that of the cutting machine, and an inclined rotating drum between said machine and hopper arranged in such a manner as to collect the cut elements from the cutting machine and arrange these elements parallel to each other before passing them by gravity into said hopper.

10. An installation for the manufacture of elongated profile bars, wires and the like from massive metal pieces of larger cross-section, comprising at least one machine for cutting these pieces into long and fine elements, rolling mill cylinders disposed so as to produce at their exit an agglomerate of the cut elements, a hopper serving for the supply of the cut elements to the rolling mill cylinders and disposed at a level below that of the cutting machine, an inclined rotating drum between said machine and hopper arranged in such a manner as to collect the cut elements from the cutting machine and arrange these elements parallel to each other before passing them by gravity into said hopper, and a device disposed so as to deliver at the inlet of said inclined rotating drum pulverulent substances with a view to modify the composition of the final shaped product.

11. An installation for the manufacture of elongated profile bars, wires and the like from massive metal pieces of larger cross-section, comprising at least one machine for cutting these pieces into long and fine elements, independent means for regulating the quantity of long and fine elements cut by each cutting machine, rolling mill cylinders disposed so as to produce at their exit an agglomerate of the cut elements, and a hopper serving for the supply of the cut elements to the rolling mill cylinders, said hopper being disposed at a level below that of the cutting machine in such a position relatively to the latter that the cut elements may reach said hopper directly by gravity.

12 An installation for the manufacture of elongated profile bars, wires and the like from massive metal pieces of larger cross-section, comprising at least one machine with a tool having a reciprocating movement for cutting these pieces into long and fine elements, the cutting edge of these reciprocating tools comprising fine teeth having faces arranged so as partly to conceal one another when viewed in the direction of feed of the pieces to be cut, the general direction of the said cutting edge being oblique relatively to the plane in which the piece to be cut is moved, rolling mill cylinders disposed so as to produce at their exit an agglomerate of the cut elements, and a hopper serving for the supply of the cut elements to the rolling mill cylinders said hopper being disposed at a level below that of the cutting machine in such a position relatively to the latter that the cut elements may reach said hopper directly by gravity.

13. An installation for the manufacture of elongated profile bars, wires and the like from massive metal pieces of larger cross-section, comprising at least one machine with a tool having a reciprocating movement for cutting these pieces into long and fine elements, each reciprocating tool having two cutting edges symmetrically inclined with respect to the direction of feed of the piece to be cut up and comprising fine teeth having faces arranged so as partly to conceal one another when viewed in the direction of feed of the pieces to be cut, the general direction of said cutting edges being oblique relatively to the plane in which the piece to be cut is moved, rolling mill cylinders disposed so as to produce at their exit an agglomerate of the cut elements, and a hopper serving for the supply of the cut elements to the rolling mill cylinders said hopper being disposed at a level below that of the cutting machine in such a position relatively to the latter that the cut elements may reach said hopper directly by gravity.

14. An installation for the manufacture of elongated profile bars, wires and the like from massive metal pieces of larger cross-section, comprising at least one machine with a tool having a reciprocating movement for cutting these pieces into long and fine elements, each reciprocating tool having two cutting edges symmetrically inclined with respect to the direction of feed of the piece to be cut up and comprising fine teeth having faces arranged so as partly to conceal one another when viewed in the direction of feed of the pieces to be cut, the general direction of said cutting edges being oblique relatively to the plane in which the piece to be cut is moved, one of the cutting edges being at a different level from that of the other cutting edge and the projections of the said cutting edges crossing each other in the direction of displacement of the tool, rolling mill cylinders disposed so as to produce at their exit an agglomerate of the cut elements, and a hopper serving for the supply of the cut elements to the rolling mill cylinders, said hopper being disposed at a level below that of the cutting machine in such a position relatively to the latter that the cut elements may reach said hopper directly by gravity.

15. An installation for the manufacture of elongated profile bars, wires and the like from massive metal pieces of larger cross-section, comprising at least one machine with a tool having a reciprocating movement for cutting these pieces into long and fine elements, each reciprocating tool having two cutting edges symmetrically inclined with respect to the direction of feed of the piece to be cut up and comprising fine teeth having faces arranged so as partly to conceal one another when viewed in the direction of feed of the pieces to be cut, the general direction of said cutting edges being oblique relatively to the plane in which the piece to be cut is moved, each cutting edge being inclined with respect to the direction of displacement of the tool, rolling mill cylinders disposed so as to produce at their exit an agglomerate of the cut elements, and a hopper serving for the supply of the cut elements to the rolling mill cylinders, said hopper being disposed at a level below that of the cutting machine in such a position relatively to the latter that the cut elements may reach said hopper directly by gravity.

16. A process for the manufacture of elongated profile bars, wires and the like from massive metal pieces of larger cross-section, consisting in cutting said metal pieces into long and fine elements, in interleaving said cut elements and in passing the interleaved elements between rolling mill cylinders arranged so as to produce at their exit the desired product.

17. A process for the manufacture of elongated profile bars, wires and the like from massive metal pieces of larger cross-section, consisting in cutting said metal pieces into long and fine elements whose length is nevertheless relatively short in comparison with the length of the desired product, in interleaving said elements, in passing these interleaved elements between rolling mill cylinders arranged so as to produce at their exit the desired product, and in guiding directly the cut elements from the place where they are cut towards a hopper serving for the supply of the rolling mill cylinders.

18. A process for the manufacture of elongated profile bars, wires and the like from massive metal pieces of larger cross-section, consisting in cutting said metal pieces into long and fine elements whose length is nevertheless relatively short in comparison with the length of the desired product, in interleaving these cut elements in parallel to each other, in leading the parallelly arranged cut elements towards rolling mill cylinders, and in passing said elements between said rolling mill cylinders arranged so as to produce at their exit the desired product.

19. A process for the manufacture of elongated bars, wires and the like from massive metal pieces of larger cross-section, consisting in cutting said metal pieces into long and fine elements, in interleaving said cut elements, in passing the interleaved elements between rolling mill cylinders, in heating the product obtained at the exit of said cylinders to a temperature sufficient to permit the welding of the elements by compression, and in passing said heated product between other rolling mill cylinders arranged so as to produce at their exit the desired product.

20. A process for the manufacture of elongated bars, wires and the like from massive metal pieces of larger cross-section, consisting in cutting said metal pieces into long and fine elements, in interleaving said cut elements, in passing the interleaved elements between rolling mill cylinders, in heating the product obtained at the exit of said cylinders to a temperature sufficient to permit the welding of the elements by compression, in passing said heated product between other rolling mill cylinders, and in drawing into a wire the product so obtained.

21. A process for the manufacture of elongated bars, wires and the like from massive metal pieces of larger cross-section, consisting in cutting said metal pieces into long and fine elements, in interleaving said cut elements, in passing the interleaved elements between rolling mill cylinders, in introducing the product obtained at the exit of these cylinders in a continuous manner into an electric furnace, in discharging the fused metal in a continuous manner, in cooling to a pasty rod the metal flowing from the furnace immediately after its exit from the latter, and in rolling this pasty rod into the desired product.

ROBERT MAUTSCH.